UNITED STATES PATENT OFFICE.

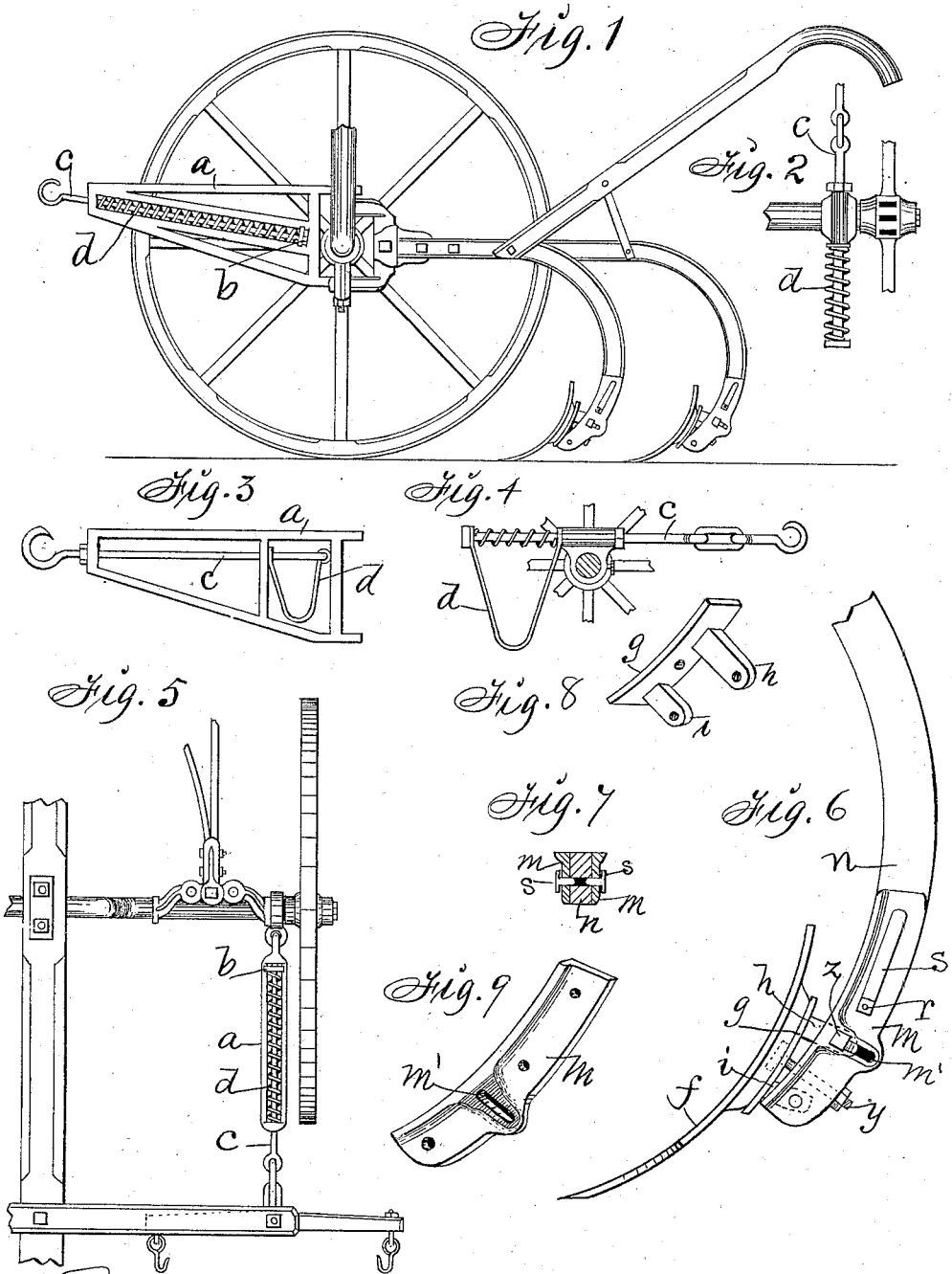

HARVEY N. TIMMS, OF DES MOINES, IOWA.

CULTIVATOR.

SPECIFICATION forming part of Letters Patent No. 371,995, dated October 25, 1887.

Application filed June 13, 1887. Serial No. 241,170. (No model.)

*To all whom it may concern:*

Be it known that I, HARVEY N. TIMMS, a citizen of the United States of America, and a resident of Des Moines, in the county of Polk and State of Iowa, have invented a new and useful Improvement in Cultivators, of which the following is a specification.

My object is to prevent the jarring, concussion, straining, and damaging of horses and machines incident to cultivator-shovels coming in contact with roots of trees and other obstructions.

My invention consists in the construction and combination of a buffer device with a singletree and a carriage and a shovel holding and adjusting device, and also a latching safety device with a standard, as hereinafter set forth, pointed out in my claims, and illustrated in the accompanying drawings, in which—

Figure 1 is a side view of a tongueless cultivator, showing my devices applied as required for practical use. Fig. 2 is a top view of a piece of the axle of a carriage having my buffer device applied in a modified form. Figs. 3 and 4 are modified forms of the buffer device. Fig. 5 is a section of a carriage having a tongue and my buffer device applied in front of the axle. Fig. 6 is a side view of a standard having my shovel-holding and safety latching devices applied as required for practical use. Fig. 7 is a view through the line $x$ $x$ of Fig. 6. Fig. 8 is a perspective view of the adjustable part of my shovel-holding device. Fig. 9 is one of the pieces that are detachably latched to the opposite sides of a standard.

$a$ represents a hitching device adapted for a tongueless cultivator. It has a slot in its center adapted to serve as a bearing for a sliding nut, $b$.

$c$ is a rod provided with a male screw at its rear end and a hook at its front end. The screw-threaded end is passed through a perforation in the front of the device $a$, then through a coiled spring, $d$, and then into the sliding nut $b$ in such a manner that the expansible force of the spring can be regulated by simply rotating the rod $c$ to compress and shorten or relax and lengthen the spring, as required, to augment or diminish the force of the spring and complete buffer device.

In Figs. 2, 4, and 5 the hitching devices $a$, to which the coiled spring $d$ is applied, are modified in form; but each one is adapted to be connected with the axle and carriage in such a manner that a singletree can be attached at its front end and a horse hitched thereto and the power applied to the cultivator through the medium of the buffer device, which will prevent jarring and concussion when an obstruction and resistance is met in the line of advance.

In Figs. 3 and 4 a U-shaped spring is substituted for a coiled spring.

$f$ is a shovel of common form.

$g$ is my adjustable shovel-holder, provided with perforated rearward extensions, $h$ and $i$.

$m$ are standard-extensions detachably connected with the lower end of the standard $n$ by means of a pivoted bolt, $r$, that passes through the lower end of the extensions $m$, and also through spring-latches $s$, that terminate in pins at their upper ends to enter perforations in the extensions $m$ and the standard $n$, as clearly shown in Fig. 7, and in such a manner that when the shovel meets undue resistance the pins on the ends of the latches will slip out of the perforations and allow the extensions $m$ to turn on the pivotal bolt in their lower ends, as required, to release the shovel, so that it can reverse its inclination and slip over the resisting obstruction.

$y$ is a screw-bolt that has its head secured to the back of a shovel in a common way and its body passed rearward through the shovel-holder $g$ and between the lower ends of the standard-extensions $m$ and a nut placed thereon, so that the shovel and shovel-holder can be thereby jointly clamped fast to the standard-extensions, as shown in Fig. 6. A bolt, $z$, passed through slots $m'$ and the extension $h$ on the shovel-holder $g$, allows the shovel-holder to be adjusted relative to the extensions $m$ and the standard $n$, as required, to regulate the depth of the shovel in the ground.

By simply turning the nut on the end of the bolt $z$ to relax its clamping force the inclination of the shovel can be changed as desired and the shovel then again rigidly fastened by drawing the nut.

I am aware that springs have been combined with hitching devices in cultivators to prevent concussion; but my manner of constructing and combining a buffer device with a hitching device of common form is novel and advantageous.

I claim as my invention—

1. The hitching and buffer device for cultivators comprising the frame $a$, sliding nut $b$, rod $c$, and spring $d$, in combination with a carriage-axle and a singletree, to operate in the manner set forth.

2. The standard-extensions $m$, the latches $s$, and the shovel-holder $g$, having extensions $h$ and $i$, adjustably and detachably combined with a shovel and a standard by means of bolts $y$ and $z$, substantially as shown and described, for the purposes stated.

HARVEY N. TIMMS.

Witnesses:
R. H. ORWIG,
THOMAS G. ORWIG.